(12) United States Patent
Yamamoto et al.

(10) Patent No.: US 11,292,905 B2
(45) Date of Patent: Apr. 5, 2022

(54) COMPOSITE PARTICLES, KIT, MATERIAL, AND METHOD FOR PRODUCING COMPOSITE PARTICLES

(71) Applicant: SUN MEDICAL CO., LTD., Moriyama (JP)

(72) Inventors: Yuya Yamamoto, Moriyama (JP); Tatsuya Ori, Moriyama (JP); Tamaki Otsuki, Moriyama (JP); Asami Okuda, Moriyama (JP); Akari Yamamoto, Moriyama (JP)

(73) Assignee: SUN MEDICAL CO., LTD., Moriyama (JP)

( * ) Notice: Subject to any disclaimer, the term of this patent is extended or adjusted under 35 U.S.C. 154(b) by 83 days.

(21) Appl. No.: 16/651,498

(22) PCT Filed: Sep. 29, 2017

(86) PCT No.: PCT/JP2017/035582
§ 371 (c)(1),
(2) Date: Mar. 27, 2020

(87) PCT Pub. No.: WO2019/064522
PCT Pub. Date: Apr. 4, 2019

(65) Prior Publication Data
US 2020/0263024 A1    Aug. 20, 2020

(51) Int. Cl.
*C08L 33/12* (2006.01)
*C08J 3/20* (2006.01)
*C08K 3/26* (2006.01)
*C08K 5/55* (2006.01)

(52) U.S. Cl.
CPC ............ *C08L 33/12* (2013.01); *C08J 3/20* (2013.01); *C08K 3/26* (2013.01); *C08K 5/55* (2013.01); *C08K 2003/267* (2013.01)

(58) Field of Classification Search
None
See application file for complete search history.

(56) References Cited

U.S. PATENT DOCUMENTS

| | | |
|---|---|---|
| 5,106,928 A | 4/1992 | Skoultchi et al. |
| 5,143,884 A | 9/1992 | Skoultchi et al. |
| 5,286,821 A | 2/1994 | Skoultchi |
| 5,376,746 A | 12/1994 | Skoultchi |
| 5,539,070 A | 7/1996 | Zharov et al. |
| 5,616,796 A * | 4/1997 | Pocius ............... B32B 7/12 564/9 |
| 5,684,102 A | 11/1997 | Pocius et al. |
| 5,690,780 A | 11/1997 | Zharov et al. |
| 5,691,065 A | 11/1997 | Zharov et al. |
| 5,718,977 A | 2/1998 | Pocius |
| 5,795,657 A | 8/1998 | Pocius et al. |
| 6,248,846 B1 | 6/2001 | Zharov et al. |
| 6,284,381 B1 | 9/2001 | Zharov et al. |
| 6,706,831 B2 | 3/2004 | Sonnenschein et al. |
| 6,710,145 B2 | 3/2004 | Sonnenschein et al. |
| 6,713,578 B2 | 3/2004 | Sonnenchein et al. |
| 6,713,579 B2 | 3/2004 | Sonnenschein et al. |
| 6,730,759 B2 | 5/2004 | Sonnenschein et al. |
| 6,806,330 B1 | 10/2004 | Sonnenschein et al. |
| 6,849,569 B2 | 2/2005 | Moren |
| 7,151,072 B2 | 12/2006 | Moren |
| 7,649,068 B2 | 1/2010 | Ahn |
| 2002/0025381 A1 | 2/2002 | Sonnenschein et al. |
| 2002/0028894 A1 | 3/2002 | Sonnenschein et al. |
| 2002/0031607 A1 | 3/2002 | Sonnenschein et al. |
| 2002/0033227 A1 | 3/2002 | Sonnenschein et al. |
| 2002/0058764 A1 | 5/2002 | Sonnenschein et al. |
| 2003/0228973 A1 | 12/2003 | Moren |
| 2005/0107557 A1 | 5/2005 | Moren |
| 2005/0215660 A1 | 9/2005 | Tomikawa et al. |
| 2008/0085983 A1* | 4/2008 | Ahn ............... C08F 220/1803 528/5 |
| 2011/0135923 A1* | 6/2011 | Ahn .................. C09J 7/385 428/355 AC |
| 2013/0178588 A1* | 7/2013 | Avataneo ............ C07F 19/00 525/55 |
| 2017/0029672 A1* | 2/2017 | Humfeld ............ C09J 163/00 |
| 2019/0040261 A1 | 2/2019 | Otsuki et al. |

(Continued)

FOREIGN PATENT DOCUMENTS

| | | |
|---|---|---|
| JP | 05-098216 A | 4/1993 |
| JP | H06-93235 A | 4/1994 |
| JP | H07-72264 B2 | 8/1995 |
| JP | H07-116249 B2 | 12/1995 |
| JP | 2003-517009 A | 5/2003 |
| JP | 3535167 B2 | 6/2004 |
| JP | 4035634 B2 | 1/2008 |
| JP | 2008-530338 A | 8/2008 |
| JP | 4975952 B2 | 7/2012 |
| WO | 03/082931 A1 | 10/2003 |

(Continued)

OTHER PUBLICATIONS

English translation of International Search Report dated Nov. 28, 2017, by the Japanese Patent Office in corresponding International Patent Application No. PCT/JP2017/035582. (2 pages).

*Primary Examiner* — Satya B Sastri

(74) *Attorney, Agent, or Firm* — Buchanan Ingersoll & Rooney PC

(57) ABSTRACT

The present invention improves the long-term storage stability of an organoborane-Lewis base complex. First composite particles of the present invention include particles of an organic polymer (B), and an organoborane-Lewis base complex (A) contained in the particles. Second composite particles of the present invention include particles of an inorganic compound (B'), and an organoborane-Lewis base complex (A) adsorbed on the particles.

13 Claims, No Drawings

(56) References Cited

U.S. PATENT DOCUMENTS

2019/0127555 A1* 5/2019 Klopsch .................... C08J 7/16

FOREIGN PATENT DOCUMENTS

| WO | 2016/002865 A1 | 1/2016 |
| WO | 2017/138567 A1 | 8/2017 |

* cited by examiner

COMPOSITE PARTICLES, KIT, MATERIAL, AND METHOD FOR PRODUCING COMPOSITE PARTICLES

TECHNICAL FIELD

The present invention relates to composite particles, a kit, a material, and a method for producing composite particles.

BACKGROUND ART

Organoboron compounds, especially tributylboron (TBB) or TBB partial oxide, have been used as a polymerization initiator for dental adhesives for many years due to their excellent adhesion performance to tooth structures.

However, these organoboron compounds react with, for example, oxygen in the air, and may ignite when these react in contact with a combustible such as paper. For this reason, attempts have been made to suppress the smoke generation and ignitability of the organoboron compound by improving additives, containers therefor and the like. For example, Patent Literature 1 discloses a paste polymerization initiator composition having a specific consistency, which contains an organoboron compound and particles inert to the organoboron compound for the purpose of suppressing ignitability, improving operability, and the like.

Further, examples in which more stable organoborane-amine complexes are used instead of the organoboron compound is known. Patent Literature 2 and Patent Literature 3 disclose two-part initiator systems capable of initiating the polymerization of acrylic adhesive composition. The first part of the two-part system includes a stable organoborane-amine complex, and the second part includes an activator, for example, an organic acid such as (meth)acrylic acid or benzoic acid, or an aldehyde compound such as benzaldehyde. The activator liberates the amine from the complex, and allows the resulting organoborane to initiate radical polymerization.

However, many of the organoborane-amine complexes dissociate over time in the (meth)acrylic monomer composition, inducing polymerization of the monomer. For this reason, there is a problem in that polymerization proceeds earlier than designed.

Patent Literature 4 discloses an acrylic adhesive useful for polymer resins having low surface energy including at least one acrylic monomer, an organoborane-amine complex, and an effective amount of an acid for initiating the polymerization of the acrylic monomer.

Patent Literature 5 discloses an adhesive effective for polymer resins having low surface energy, which is an acrylic composition including an acrylic monomer, an organoborane-polyamine complex, and an amine-reactive compound.

Patent Literature 6 proposes an initiator system including both an organoborane-amine complex and a β-ketone compound, and in this initiator system, the β-ketone compound serves as a decomplexer and gradually liberates the organoborane to provide a longer working time of the bonding composition.

However, similarly to Patent Literatures 2 and 3, Patent Literatures 4 to 6 are silent with respect to the stability of the organoborane-amine complex in the presence of (meth)acrylic monomer, and do not describe any approaches for enhancing the storage stability. Further, Patent Literatures 2 to 6 do not report that their compositions exhibit excellent adhesion with respect to biological hard tissues (for example, tooth structures).

CITATION LIST

Patent Literature

Patent Literature 1: International Publication No. WO 03/082931
Patent Literature 2: Japanese Patent Publication No. 7-72264
Patent Literature 3: Japanese Patent Publication No. 7-116249
Patent Literature 4: Japanese Patent No. 3535167
Patent Literature 5: Japanese Patent No. 4035634
Patent Literature 6: Japanese Patent No. 4975952

SUMMARY OF INVENTION

Technical Problem

An object of the present invention is to improve the long-term storage stability of an organoborane-Lewis base complex.

Solution to Problem

The present inventors have made intensive studies directed to achieving the above object. As a result, the present inventors have found that the above object can be achieved by composite particles having the following configurations, thereby completing the present invention. For example, aspects of the present invention reside in the following [1] to [18].

[1] Composite particles including: particles of an organic polymer (B); and an organoborane-Lewis base complex (A) contained in the particles.

[2] Composite particles including: particles of an inorganic compound (B'); and an organoborane-Lewis base complex (A) adsorbed on the particles.

[3] The composite particles according to [1] or [2], in which an organoborane of the component (A) is at least one selected from a compound represented by $BR_3$, wherein each R is independently an alkyl group having 1 to 20 carbon atoms, an aryl group having 6 to 20 carbon atoms, a saturated or unsaturated alicyclic group having 3 to 20 carbon atoms, or an alkoxy group having 1 to 20 carbon atoms, and two or more of the groups R may be bonded to each other to form a ring, and a partial oxide of the compound represented by $BR_3$.

[4] The composite particles according to any one of [1] to [3], in which a Lewis base of the component (A) is at least one selected from an amine, an amidine, a hydroxide, and an alkoxide.

[5] The composite particles according to [1] or [2], in which the component (A) is a compound represented by $(N(R^1)_m(H)_{2-m}-R^2O)_n BR_{3-n}$, wherein $R^1$ is an alkyl group having 1 to 20 carbon atoms, $R^2$ is an alkylene group having 1 to 20 carbon atoms, R is an alkyl group having 1 to 20 carbon atoms, an aryl group having 6 to 20 carbon atoms, a saturated or unsaturated alicyclic group having 3 to 20 carbon atoms, or an alkoxy group having 1 to 20 carbon atoms, two of the groups R may be bonded to each other to form a ring, m is 1 or 2, and n is 1 or 2.

[6] The composite particles according to [1], in which the component (B) has a weight average molecular weight (Mw)

in terms of polymethyl methacrylate, as measured by gel permeation chromatography (GPC), of 1,000 to 3,000,000.

[7] The composite particles according to [1] or [6], in which a content of the component (B) is 50 to 5,000 parts by mass per 100 parts by mass of the organoborane-Lewis base complex (A).

[8] The composite particles according to [2], in which the component (B') is at least one selected from a compound represented by $Mg_xAl_y(OH)_zCO_3 \cdot nH_2O$, wherein x, y, and z are each a positive number, and satisfy $0.18 \leq y/(x+y) \leq 0.32$, $2.0 \leq z/(x+y) \leq 2.5$, and n is a number of 0 to 5, and a magnesium-aluminum solid solution.

[9] The composite particles according to [2] or [8], in which a liquid adsorption of the component (B') is 50 mL/100 g or more.

[10] The composite particles according to [2], [8], or [9], in which a content of the component (A) is 1 to 1,000 parts by mass when a content of the component (B') is 100 parts by mass.

[11] A kit including: the composite particles according to any one of [1] to [10] or a composition containing the composite particles; and a polymerizable composition containing a polymerizable compound.

[12] The kit according to [11], in which the polymerizable composition contains a polymerizable compound having at least one acidic group in the molecule and a polymerizable compound having no acidic group in the molecule.

[13] The kit according to [11] or [12], in which the composite particles contain the component (B), and at 25° C., the component (B) contained in the composite particles dissolves at a ratio of 1 part by mass or more to 100 parts by mass of the polymerizable compound contained in the polymerizable composition.

[14] A material obtained from the kit according to any one of [11] to [13].

[15] The material according to [14], which is used for medical and/or dental applications.

[16] The material according to [14] or [15], which is used as an adhesive or a filler.

[17] A method for producing composite particles, including the steps of: dissolving an organic polymer (B) in a solvent to prepare a solution of the organic polymer (B) and mixing the solution with an organoborane-Lewis base complex (A) to prepare a composition containing the organoborane-Lewis base complex (A) and the organic polymer (B) dissolved in the solvent; and drying the composition.

[18] A method for producing composite particles, including the steps of: dissolving or dispersing an organoborane-Lewis base complex (A) in a solvent and dispersing an inorganic compound (B') to prepare a composition; and drying the composition.

Advantageous Effects of Invention

According to the present invention, it is possible to provide composite particles containing an organoborane-Lewis base complex as a polymerization initiator and having excellent storage stability over a long period of time. Materials obtained from a kit including the composite particles and the polymerizable composition have high adhesion with respect to biological hard tissues when used as an adhesive or a filler, and are therefore highly useful particularly as medical and/or dental materials.

DESCRIPTION OF EMBODIMENTS

Embodiments of the present invention will be described below. In the present specification, the "acrylic" and "meth-acrylic" are also collectively described as "(meth)acrylic", and the "acrylate" and "methacrylate" are also collectively described as "(meth)acrylate."

[Composite Particles]

First composite particles of the present invention include particles of an organic polymer (B) (hereinafter, also simply referred to as "polymer (B)"), and an organoborane-Lewis base complex (A) contained in the particles.

Second composite particles of the present invention include particles of an inorganic compound (B'), and an organoborane-Lewis base complex (A) adsorbed on the particles.

The complex (A) may also be described as "component (A)," and the same applies to other components. The polymer (B) and the inorganic compound (B') are also collectively referred to as "compound (BB)." The first and second composite particles of the present invention are also collectively referred to as "composite particles of the present invention."

In the present invention, the "organoborane-Lewis base complex (A) contained in the particles" means that all of the component (A) may be supported inside the particles, or a part of the component (A) may be attached to the surface of the particles.

<Organoborane-Lewis Base Complex (A)>

The organoborane-Lewis base complex (A) is a complex of an organoborane (A1) and a Lewis base (A2). In the component (A), the high reaction activity of the organoborane (A1) is stabilized with the Lewis base (A2). In the composite particles of the present invention, the component (A) is contained in the particles of the polymer (B) or is adsorbed on the particles of the inorganic compound (B').

In the case of the polymer (B), for example, the component (A) is gradually released as the polymer (B) dissolves in a polymerizable compound described later. Thereafter, a decomplexer (i) described later and the like act on the component (A) and the stabilization of the organoborane (A1) by the Lewis base (A2) disappears, for example thereby liberating the organic borane (A1) to allow the organic borane (A1) to function as a polymerization initiator.

In the case of the inorganic compound (B'), when the component (A) adsorbed on the particles of the inorganic compound (B') comes into contact with the polymerizable compound described later, the component (A) is gradually diffused into the system from the surface layer portion of the inorganic compound (B'). The mechanism of action of liberation of the organic borane (A1) by the action of the decomplexer (i) and the like thereafter is as described above.

Although the organoborane (A1) and the Lewis base (A2) will be described in detail below, the organoborane-Lewis base complex (A) may be a complex in which the organoborane (A1) and the Lewis base (A2) are bonded to each other by a covalent bond or the like to form a complex within one molecule.

Examples of the organoborane-Lewis base complexes (A) in which the organoborane (A1) and the Lewis base (A2) are bonded to each other include compounds represented by $(N(R^1)_m(H)_{2-m}\text{—}R^2O)_nBR_{3-n}$. In the formula, $R^1$ is an alkyl group having 1 to 20 carbon atoms, $R^2$ is an alkylene group having 1 to 20 carbon atoms, R is an alkyl group having 1 to 20 carbon atoms, an aryl group having 6 to 20 carbon atoms, a saturated or unsaturated alicyclic group having 3 to 20 carbon atoms, or an alkoxy group having 1 to 20 carbon atoms, two of the groups R may be bonded to each other to form a ring, m is 1 or 2, and n is 1 or 2. Specific examples of the compounds include $H_3C\text{—}NH\text{—}(CH_2)_2\text{—}O\text{—}B(CH_2CH_3)_2$, and $H_3C\text{—}NH\text{—}(CH_2)_2\text{—}O\text{—}B(C_6H_{11})_2$.

<Organoborane (A1)>

Examples of the organoboranes (A1) include organoboranes in which the boron atom has an empty p-orbital or electrophilic properties.

Examples of the organoboranes (A1) include compounds represented by $BR_3$ and partial oxides of the compounds represented by $BR_3$. In the formula, B is a boron atom, each R is independently an alkyl group having 1 to 20 carbon atoms, an aryl group having 6 to 20 carbon atoms, a saturated or unsaturated alicyclic group having 3 to 20 carbon atoms, or an alkoxy group having 1 to 20 carbon atoms, and although two or more of the groups R may be bonded to each other to form a ring such as an aliphatic ring, it is preferable that the ring be not formed from the viewpoint of activity. Each R is preferably the above-described group other than the aryl group, more preferably the above-described alkyl group, still more preferably an alkyl group having 1 to 10 carbon atoms, and particularly preferably an alkyl group having 1 to 5 carbon atoms. It is preferable that all the groups R be the same.

Examples of the partial oxides of the compounds represented by $BR_3$ include partial oxides obtained by adding preferably 0.3 to 0.9 mol, and more preferably 0.4 to 0.6 mol of oxygen, to 1 mol of the compound represented by $BR_3$. The partial oxide of the compound represented by $BR_3$ is preferably a partially oxidized trialkyl boron obtained by partially oxidizing a trialkyl boron in which three of the groups R are each independently an alkyl group having 1 to 20 carbon atoms.

Examples of the compounds represented by $BR_3$ include trialkylboranes such as trimethylborane, triethylborane, tripropylboranes including tri-n-propylborane and triisopropylborane, and tributylboranes including tri-n-butylborane, triisobutylborane and tri-sec-butylborane; alkyl and alicyclic ring-containing boranes such as ethyldicyclohexylborane and (1,3-cyclopentadienyl)dimethylborane; and aryldialkylboranes such as phenyldiethylborane.

In the organoborane (A1), it is preferable that one or more carbon atoms be bonded directly to the boron atom. However, when a π-electron atomic group such as an aromatic ring is bonded to an empty p-orbital of the boron atom in a way that they can form a conjugated system, they may be stabilized as in triphenylborane and the activity thereof may be reduced.

The organoboranes (A1) may be used singly, or two or more thereof may be used in combination.

<Lewis Base (A2)>

Examples of the Lewis bases (A2) include amines, amidines, hydroxides and alkoxides, and amines are preferable. Examples of the amines include primary to tertiary monoamines, polyamines (with the proviso that among these monoamines and polyamines, heterocyclic amines and amines having an amidine structure are excluded), and heterocyclic amines (with the proviso that amines having an amidine structure are excluded), and other examples include conjugated imines and primary amines having a hydrogen bond accepting group disclosed in National Publication of International Patent Application No. 2003-517009. Of these, monoamines and polyamines are preferable.

<<Primary to Tertiary Monoamine>>

Examples of substituents for hydrogen atoms in the monoamines include organic groups, preferably alkyl groups having 1 to 10 carbon atoms, aryl groups, arylalkyl groups, alkoxy groups, alkoxyalkyl groups, hydroxyalkyl groups, carboxyalkyl groups, and polyoxyalkyl groups. One or more hydrogen atoms of the aryl group may be substituted with at least one selected from alkyl groups, alkoxy groups, carboxyl groups, alkoxycarbonyl groups, aldehyde groups, and halogen atoms.

Specific examples include primary monoamines such as ethylamine, butylamine, hexylamine, octylamine, benzylamine, methoxyethylamine, methoxypropylamine, methoxybutylamine, ethoxypropylamine, propoxypropylamine, ethanolamine and polyoxyalkylenemonoamine; secondary monoamines such as dimethylamine, diethylamine, dibutylamine, diethanolamine, N-phenylglycine and N-tolylglycine; and tertiary amines such as triethylamine, methyldiethanolamine, dimethylethanolamine, triethanolamine, N,N-dimethylaniline, N,N-dimethyl-p-tert-butylaniline, N,N-dimethyl-p-chloroaniline, N,N-dimethylanisidine, N,N-dimethylaminobenzoic acid and alkyl esters thereof, N,N-diethylaminobenzoic acid and alkyl esters thereof, N,N-dimethylaminobenzaldehyde, N,N-dimethyl-p-toluidine, N,N-diethyl-p-toluidine, and N,N-diethanol-p-toluidine. Of these, primary monoamines are preferable.

<<Polyamine>>

Examples of the polyamines include diamines, triamines and tetramines.

Examples of the diamines include aliphatic diamines such as 1,2-diaminoethane, 1,3-diaminopropane, 1,5-diaminopentane, 1,6-diaminohexane, 1,12-diaminododecane, 2-methyl-1,5-diaminopentane, 3-methyl-1,5-diaminopentane, dimethylaminopropylamine, dimethylaminoethylamine and dimethylaminobutylamine; and alicyclic diamines such as isophoronediamine. The diamines preferably have at least two carbon atoms, and more preferably at least three carbon atoms, between the two amino groups.

Examples of the triamines include aliphatic triamines such as diethylenetriamine and dipropylenetriamine. Examples of the tetramines include aliphatic tetramines such as triethylenetetramine. The triamines and tetramines preferably have at least two carbon atoms between amino groups.

Examples of the polyamines further include polyoxyalkylenepolyamines having a molecular weight of 1,000 or less. Examples of the polyoxyalkylenepolyamines include polyethylene oxide diamine, polypropylene oxide diamine, polypropylene oxide triamine, diethylene glycol dipropyl amine, triethylene glycol dipropyl amine, polytetramethylene oxide diamine, poly(ethylene oxide-iso-propylene oxide) diamine, poly(ethylene oxide-iso-propylene oxide) triamine, and trimethylolpropane tris(poly(propylene glycol), amine terminated) ether.

<<Heterocyclic Amine>>

The heterocyclic amine is an aliphatic heterocyclic compound or aromatic heterocyclic compound having at least one nitrogen atom in the heterocycle, and may further have one or more oxygen atoms, sulfur atoms or double bonds in the heterocycle. The heterocyclic amine may be a polycyclic compound having a nitrogen atom in at least one of the rings.

The heterocyclic amine is preferably a compound represented by Formula (1):

[Chem. 1]

(1)

In Formula (1), each R¹ is independently a hydrogen atom, an alkyl group having 1 to 10 carbon atoms or a cycloalkyl group having 3 to 10 carbon atoms, and preferably a hydrogen atom or a methyl group. Each Z is independently an oxygen atom, a sulfur atom or —N(R²)—, and preferably —N(R²)—. Each R² is independently a hydrogen atom, an alkyl group having 1 to 10 carbon atoms, a cycloalkyl group having 3 to 10 carbon atoms, an aryl group having 6 to 10 carbon atoms or an aralkyl group having 7 to 10 carbon atoms, preferably a hydrogen atom or an alkyl group having 1 to 4 carbon atoms, and more preferably a hydrogen atom or a methyl group. Each x is independently an integer of 1 to 9, provided that the total of all x's is 2 to 10. Each x is preferably an integer of 1 to 4, provided that the total of all x's is preferably 3 to 5. Each y is independently 0 or 1. The hydrogen atom in —NH— in the formula may be substituted with an amino group or an aminoalkyl group, and some of the alkylene groups forming the ring structure may be substituted with an alkenylene group.

Examples of the heterocyclic amines include the compounds represented by the above Formula (1) as aziridine, pyrrolidine, 3-pyrroline, piperidine, morpholine, N-(3-aminopropyl)morpholine, piperazine, 1-amino-4-methylpiperazine, homopiperazine and thiazolidine, and 1,3,3-trimethyl-6-azabicyclo[3.2.1]octane, 1,4-diazabicyclo[2.2.2]octane and 4-(N,N-dimethylamino)-pyridine.

<<Amidine>>

The amidine is preferably a compound represented by Formula (2):

[Chem. 2]

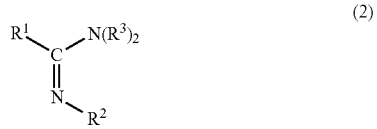

(2)

In Formula (2), each of R¹ to R³ is independently a hydrogen atom, an alkyl group having 1 to 10 carbon atoms or a cycloalkyl group having 3 to 10 carbon atoms, and preferably a hydrogen atom, an alkyl group having 1 to 4 carbon atoms or a cycloalkyl group having 5 to 6 carbon atoms. R¹ may be —N(R³)₂. Two or more of R¹ to R³ may be bonded to each other to form a ring structure such as a monocyclic or a bicyclic structure, and the ring may have one or more nitrogen atoms, oxygen atoms, sulfur atoms, or double bonds. Specifically, R² and one R³ may be bonded to form a monocyclic structure, or R¹ and one R³, and R² and the other R³ may be bonded to form a bicyclic structure.

Examples of the amines having an amidine structure include 1,8-diazabicyclo[5.4.0]undec-7-ene, 1,5-diazabicyclo[4.3.0]non-5-ene, 2-methyl-2-imidazoline, 2-methylimidazole, tetrahydropyrimidine and 1,1,3,3-tetramethylguanidine.

<<Hydroxides and Alkoxides>>

As the Lewis base (A2) a hydroxide and/or an alkoxide, represented by $(R—O^-)_m M^{n+}$, may be used. In the formula, each R is independently a hydrogen atom or an alkyl group. m is an integer. $M^{n+}$ is a counter ion and is, for example, sodium, potassium, tetraalkylammonium or a combination thereof, and n is an integer.

<<Preparation of Organoborane-Lewis Base Complex (A)>>

The organoborane-Lewis base complex (A) may be prepared by a known method. Usually, the Lewis base (A2) is reacted with the organoborane (A1) in an atmosphere of an inert gas such as nitrogen while slowly stirring the reaction system. It is preferable to add the organoborane (A1) dropwise to the reaction system, and to cool the mixture when heat generation is observed. In the case of a compound having a high vapor pressure, the reaction temperature is preferably 80° C. or lower, and more preferably 70° C. or lower. The prepared complex is preferably stored in a closed container in a cool dark place.

The molar ratio (A2/A1) of the Lewis base (A2) to the organoborane (A1) in the complex is preferably 0.5 to 3.0, and more preferably 1.0 to 2.0. Such an embodiment is advantageous in terms of the stability of the complex and the adhesion of the organoborane-Lewis base complex (A) when used as an adhesive or a filler.

Examples of the solvents used in the production of the complex include ethers such as tetrahydrofuran and diethyl ether; and low-molecular weight alkanes such as hexane and heptane. After the completion of the reaction, the solvent is removed by, for example, using a rotary evaporator.

<Compound (BB)>

When the component (A) is contained in the particles of the polymer (B), or when the component (A) is adsorbed on the particles of the inorganic compound (B'), decomposition of the component (A) is difficult to proceed even when the composite particles of the present invention are stored under atmospheric air. Therefore, the component (A) contained in the composite particles of the present invention can exhibit performance as a polymerization initiator even after long-term storage.

<<Polymer (B)>>

Hereinafter, an embodiment using the polymer (B) will be described.

The weight average molecular weight (Mw) of the polymer (B) in terms of polymethyl methacrylate is preferably 1,000 to 3,000,000, more preferably 2,000 to 2,000,000, and particularly preferably 3,000 to 1,000,000. The molecular weight is measured by gel permeation chromatography (GPC) or the like.

Examples of the polymers (B) include synthetic polymers such as poly(meth)acrylate, polystyrene, butadiene-based polymers such as methacrylbutadienestyrene (MBS), polyethylene glycol, polypropylene glycol, polyallylamine having a primary amine, polyacrylamine having a primary amine, polyacrylonitrile, polyamide (Nylon™), silicone resins, polyurethane, melamine resins, phenolic resins and fluorine resins; and natural polymers such as cellulose, cellulose acetate, chitosan and polylysine. Among these, poly(meth)acrylate, polyallylamine having a primary amine, and polyacrylamine having a primary amine are particularly preferably used.

Examples of the poly(meth)acrylates include homopolymers and/or copolymers of (meth)acrylate compounds contained in polymerizable compounds described later. The (meth)acrylate compound is preferably a (meth)acrylate compound having no acidic group in the molecule, but a (meth)acrylate compound having at least one acidic group in the molecule may be used as long as the storage stability of the composite particles is not affected.

Examples of the homopolymers and/or copolymers of (meth)acrylate compounds include polymethyl (meth)acrylate, polyethyl (meth)acrylate, polypropyl (meth)acrylate, polybutyl (meth)acrylate, and copolymers of methyl (meth)acrylate and ethyl (meth)acrylate, and polymethyl (meth)acrylate is preferable.

The polymers (B) may be used singly, or two or more thereof may be used in combination.

The polymer (B) is preferably solid at room temperature.

From the viewpoint of causing the component (A) to be contained in the polymer (B), the amount of the polymer (B) is preferably 50 to 5,000 parts by mass, more preferably 100 to 3,000 parts by mass, and particularly preferably 150 to 2,000 parts by mass, per 100 parts by mass of the component (A).

<<Inorganic Compound (B')>>

Hereinafter, an embodiment using the inorganic compound (B') will be described.

As the inorganic compound (B'), those having a basic solid surface are preferable from the viewpoint of the stability of the component (A) to be adsorbed on the particles of the component (B'). Examples thereof include compounds represented by $Mg_xAl_y(OH)=CO_3.nH_2O$, wherein x, y, and z are each a positive number, and satisfy a relational expression of $0.18 \leq y/(x+y) \leq 0.32$, $2.0 \leq z/(x+y) \leq 2.5$, and n is a number of 0 to 5, and specific examples thereof include $Mg_{4.5}Al_2(OH)_{13}CO_3.3.5H_2O$ and $Mg_6Al_2(OH)_{16}CO_3.4H_2O$. x in the above expression is usually 1 to 10, preferably 4 to 6, y is usually 1 to 4, preferably 1 to 2, and z is usually 10 to 20, and preferably 12 to 18. These x, y, and z satisfy the above-mentioned relational expression. n is usually 0 to 5, and preferably 2 to 4.

Examples of the inorganic compounds (B') include magnesium-aluminum solid solutions and compounds having a solid solution structure represented by $MgO$—$Al_2O_3$, specifically, $(Mg_{1-x}Al_x)_{1+0.5x}$, wherein x is a number satisfying $0<x<0.4$. Specific examples thereof include $Mg_{0.7}Al_{0.3}O_{1.15}$ and $Mg_{0.75}Al_{0.25}O_{1.125}$, and $Mg_{0.7}Al_{0.3}O_{1.15}$ is preferable.

The inorganic compounds (B') may be used singly, or two or more thereof may be used in combination. The inorganic compound (B') may be used in combination with the polymer (B) as long as the stability of the organoborane-Lewis base complex (A) is not impaired.

It is preferable that the inorganic compound (B') not contain a compound capable of forming a solid acid such as silicic acid, from the viewpoint of decomplexing the component (A).

The liquid adsorption of the inorganic compound (B') is preferably 50 mL/100 g or more, more preferably 150 mL/100 g or more, and still more preferably 200 mL/100 g or more, when measured according to JIS K5101. Such an embodiment is advantageous in that the absolute amount of the organoborane-Lewis base complex (A) capable of initiating polymerization is not insufficient. The upper limit of the liquid adsorption of the inorganic compound (B') is not particularly limited, and is, for example, 2,000 mL/100 g, 1,500 mL/100 g, or 1,200 mL/100 g.

From the viewpoint of supporting the component (A) on the surface layer portion and the inner layer portion of the inorganic compound (B'), the content of the component (A) is preferably 1 to 1,000 parts by mass, more preferably 10 to 800 parts by mass, and still more preferably 30 to 600 parts by mass, when the content of the inorganic compound (B') is 100 parts by mass.

The particle size of the inorganic compound (B') is not particularly limited, and the average particle size is usually 100 μm or less, preferably 70 μm or less, and more preferably 50 μm or less. The average particle size is a 50% particle size (d50, median diameter) when the particle size distribution measured by a grain size distribution analyzer (laser diffraction/scattering method) is represented by a volume cumulative distribution. The lower limit of the average particle size is not particularly limited, and is usually 0.01 μm, and preferably 0.1 μm. Such an embodiment is advantageous in that the operability when used as an adhesive is good and the compatibility thereof with a prosthesis is good so that floating can be prevented.

<Production of Composite Particles>

A method for producing composite particles of the present invention using the polymer (B) includes the steps of dissolving the polymer (B) in a solvent to prepare a solution of the polymer (B) and mixing the solution with the organoborane-Lewis base complex (A) to prepare a composition containing the organoborane-Lewis base complex (A) and the polymer (B) dissolved in the solvent, and drying the composition. The composite particles of the present invention may be produced through the step of melting the polymer (B) and mixing the melted polymer (B) with the organoborane-Lewis base complex (A).

A method for producing composite particles of the present invention using the inorganic compound (B') includes the steps of dissolving or dispersing the organoborane-Lewis base complex (A) in a solvent and dispersing the inorganic compound (B') to prepare a composition, and drying the composition.

Since the polymer (B) is usually a solid and is particulate, when the organoborane-Lewis base complex (A) and the polymer (B) are simply mixed with each other, the organoborane-Lewis base complex (A) is attached to the surface of the particles of the polymer (B), and is hardly contained in the particles of the polymer (B). However, for example, by mixing a solution in which the polymer (B) is dissolved in a solvent with the organoborane-Lewis base complex (A), the organoborane-Lewis base complex (A) can be dispersed in the solution, and by drying and removing the solvent thereafter, the organoborane-Lewis base complex (A) can be contained in the particles of the polymer (B). Also, in the case of the inorganic compound (B'), the organoborane-Lewis base complex (A) can be adsorbed on the particles of the inorganic compound (B') by dispersing the organoborane-Lewis base complex (A) in the solvent and drying the solvent.

The solvent is capable of dissolving the polymer (B). The solvent is also capable of dispersing the inorganic compound (B'). Here, the expression "dissolution" means that white turbidity or precipitation does not occur when the solvent and the polymer (B) are mixed. For this purpose, it is preferable to appropriately select the solvent in consideration of the solubility parameter.

The solvent has a boiling point at atmospheric pressure of preferably 1 to 300° C., more preferably 5 to 200° C., and particularly preferably 10 to 150° C. By using a solvent having a boiling point within the above range, the solvent can be easily removed when the composition containing the organoborane-Lewis base complex (A), the compound (BB), and the solvent is dried in the production process of the composite particles.

The solvent is not particularly limited, and is preferably a nonpolar solvent or an aprotic polar solvent from the viewpoint of having no reactivity with the organoborane-Lewis base complex (A).

Examples of the solvents include hydrocarbons such as pentane, hexane, cyclohexane, heptane, benzene and toluene; halogenated hydrocarbons such as chlorobenzene, fluorobenzene, dichloroethane and so-called Freon™; ethers such as diethyl ether, diisopropyl ether, ethylene glycol dimethyl ether, dioxane and tetrahydrofuran; ketones such as acetone, methyl ethyl ketone and diethyl ketone; and esters such as methyl acetate, ethyl acetate and isopropyl acetate. Of these, hydrocarbons, ketones, ethers and esters are preferable, and hexane, acetone, methyl ethyl ketone, tetrahydrofuran and ethyl acetate are particularly preferable. The solvents may be used singly, or two or more thereof may be used in combination.

The amount of the polymer (B) used is preferably 50 to 5,000 parts by mass, more preferably 100 to 3,000 parts by mass, and particularly preferably 150 to 2,000 parts by mass, per 100 parts by mass of the organoborane-Lewis base complex (A).

From the viewpoint of adsorbing and supporting the organoborane-Lewis base complex (A) on the surface layer portion and the inner layer portion of the inorganic compound (B'), when the amount of the inorganic compound (B') used is 100 parts by mass, the amount of the organoborane-Lewis base complex (A) used is preferably 1 to 1,000 parts by mass, more preferably 10 to 800 parts by mass, and still more preferably 30 to 600 parts by mass.

The amount of the solvent blended is preferably 50 to 10,000 parts by mass, more preferably 100 to 4,000 parts by mass, and particularly preferably 200 to 3,000 parts by mass, per 100 parts by mass of the polymer (B), from the viewpoint of dissolving the polymer (B) and obtaining composite particles containing the organoborane-Lewis base complex (A) in the particles of the polymer (B) after drying the composition.

The amount of the solvent blended is preferably 50 to 5,000 parts by mass, more preferably 100 to 3,000 parts by mass, and particularly preferably 200 to 2,000 parts by mass, per 100 parts by mass of the inorganic compound (B'), from the viewpoint of uniformly dispersing the inorganic compound (B') and obtaining composite particles in which the organoborane-Lewis base complex (A) is adsorbed on the particles of the inorganic compound (B') after drying the composition.

The composition may optionally contain a complexer, in addition to the organoborane-Lewis base complex (A), the compound (BB), and the solvent. By adding the complexer, the storage stability of the composite particles can be further improved. Examples of the complexers include the aforementioned Lewis base (A2). The amount of the complexer blended is preferably 0.01 to 500 parts by mass, and more preferably 0.1 to 100 parts by mass, per 100 parts by mass of the organoborane-Lewis base complex (A).

The composition is obtained by stirring and mixing the organoborane-Lewis base complex (A), the compound (BB), the solvent, and optionally the complexer, preferably until the mixture becomes homogeneous. Examples of the mixing methods include a method of adding the solvent and the polymer (B) to a beaker or the like, stirring the mixture with a stirring motor, and then mixing the mixture with the organoborane-Lewis base complex (A) and optionally the complexer. Examples of the mixing methods further include a method of adding the solvent and the organoborane-Lewis base complex (A) to a beaker or the like, stirring the mixture with a stirring motor, and then mixing the mixture with the inorganic compound (B') and optionally the complexer. In addition, ultrasonic waves may be used in combination to enhance the dispersibility of the inorganic compound (B') in the solvent.

Thereafter, the composition is dried to remove the solvent. At this time, the composition is dried preferably at 80° C. or lower, more preferably 60° C. or lower, and preferably 300 hours or lower, more preferably 200 hours or lower. Optionally, the composition may be heated or freeze-dried. The temperature may be reduced, for example, to −200° C.

Thereafter, the composition from which the solvent has been removed is preferably crushed and formed into particulates. The crushing may be performed by, for example, a freezer mill.

Further, the composition containing the organoborane-Lewis base complex (A) and the polymer (B) dissolved in the solvent may be dried by spray drying. In this case, it is not necessary to perform the step of crushing by adjusting the viscosity of the composition.

In one embodiment, the average particle size of the composite particles is preferably 0.001 to 200 μm, more preferably 0.005 to 100 μm, and still more preferably 0.01 to 80 μm. In the case of using the polymer (B), such an average particle size is preferable.

In one embodiment, the average particle size of the composite particles is preferably 0.01 to 100 μm, more preferably 0.01 to 70 μm, and still more preferably 0.1 to 50 μm. In the case of using the inorganic compound (B'), such an average particle size is preferable.

The average particle size is a 50% particle size (d50, median diameter) when the particle size distribution measured by a grain size distribution analyzer (laser diffraction/scattering method) is represented by a volume cumulative distribution.

The composite particles of the present invention are in the form of a solid such as a powder. Therefore, unlike the liquid or paste form, the composite particles can easily maintain a state in which the organoborane-Lewis base complex (A) is contained in or adsorbed on the particles of the compound (BB), and is excellent in storage stability.

[Kit]

A kit of the present invention includes the above-described composite particles or a composition containing the composite particles (hereinafter also referred to as "polymerization initiator composition (1)" or "composition (1)"), and a polymerizable composition containing a polymerizable compound (hereinafter also referred to as "composition (2)"). For example, in the kit, the composition (1) and the composition (2) are stored in separate containers.

Two or more of composite particles of the present invention may be used. For example, the first composite particles of the present invention and the second composite particles of the present invention may be used in combination.

<Polymerization Initiator Composition (1)>

The polymerization initiator composition (1) is the composite particles or a composition containing the composite particles. The composition (1) may further contain the polymer (B) described above from the viewpoint of improving the polymerization rate and the degree of polymerization when mixed with the polymerizable composition (2). The composition (1) may optionally further contain a filler (iii), an additional component (iv) described later, and the like. From the viewpoint of long-term storage stability, it is preferable that the component to be blended to the composition (1) be a component that does not dissolve the compound (BB).

When the polymer (B) is used as the compound (BB), the polymer (B) contained in the composite particles is preferably a polymer (B) that preferably dissolves, at 25° C., in an amount of 1 part by mass or more, more preferably 3 parts by mass or more, and still more preferably 5 parts by mass or more, per 100 parts by mass of the polymerizable compound contained in the composition (2). Here, the expression "dissolve" means that white turbidity or precipitation does not occur when the polymer (B) and the polymerizable compound are mixed. By using the polymer (B) that dissolves in the polymerizable compound in an amount within the above range, when the composition (1) and the composition (2) containing the polymerizable compound are mixed, the polymer (B) dissolves in the polymerizable compound. As a result, the organoborane-Lewis base complex (A) is gradually released from the polymer (B).

The content of the composite particles in 100 mass % of the composition (1) is preferably 1 to 100 mass %, more preferably 3 to 80 mass %, and particularly preferably 5 to 60 mass %.

<Polymerizable Composition (2)>

The composition (2) preferably contains a decomplexer (hereinafter also referred to as "decomplexer (i)"), and the composition (2) preferably contains a polymerizable compound having no acidic group in the molecule (hereinafter also referred to as "polymerizable compound (ii)"). The composition (2) may optionally further contain a filler (iii), an additional component (iv), and the like.

<Decomplexer (i)>

The decomplexer (i) is reactive to the Lewis base (A2) so that the organoborane (A1) can be liberated from the organoborane-Lewis base complex (A) serving as a polymerization initiator.

By liberating the organoborane (A1) from the organoborane-Lewis base complex (A), the organoborane (A1) functions as a polymerization initiator, allowing rapid initiation of the polymerization of the polymerizable compound, and a cured product can thus be obtained.

An amine-reactive compound which is an example of the decomplexers (i) reacts with an amine so as to cleave the chemical bonding between the organoborane and the amine and to thereby liberate the organoborane from the organoborane-amine complex. The same applies to the Lewis bases (A2) other than amines.

Preferred amine-reactive compounds are substances capable of readily forming a reaction product with an amine at about room temperature, for example, about 20 to 22° C. Such compounds are advantageous in that compositions obtained therefrom can generally be readily used and cured under ambient conditions.

Examples of the decomplexers (i) include acids, aldehydes, isocyanates, acid chlorides, sulfonyl chlorides and mixtures of two or more of these compounds, and acids are preferable. Both Bronsted and Lewis acids may be used. U.S. Pat. No. 5,718,977 to Pocius, 9th column, lines 1-15, describes preferred acid compounds (compounds disclosed in the column are incorporated herein by reference).

In the kit of the present invention, the amount of the decomplexer (i) is usually 0.01 to 500 parts by mass, preferably 0.1 to 200 parts by mass, and more preferably 1 to 100 parts by mass, per 100 parts by mass of the total of the organoborane-Lewis base complex (A) in the composition (1) and the polymerizable compound (ii) having no acidic group in the molecule in the composition (2). Such an embodiment is advantageous in terms of dissociating the organoborane-Lewis base complex (A) and thereby allowing the organoborane to favorably initiate the polymerization of the polymerizable compound.

The decomplexer (i) is preferably a polymerizable compound having at least one acidic group in the molecule.

<<Polymerizable Compound Having at Least One Acidic Group in the Molecule>>

The polymerizable compound having at least one acidic group in the molecule is a compound having at least one ethylenically unsaturated group capable of radical polymerization and at least one acidic group in the molecule. Examples of the acidic groups include carboxylic acid groups such as a carboxyl group and a carboxylic anhydride group, phosphoric acid groups, thiophosphoric acid groups, pyrophosphoric acid groups, sulfonic acid groups, and phosphonic acid groups. The polymerizable compound may have one acidic group, or may have two or more acidic groups.

Examples of the polymerizable compounds include (meth)acrylate compounds having at least one acidic group in the molecule and polymerizable compounds having at least one acidic group in the molecule other than those (meth)acrylate compounds, and from the viewpoint of the solubility of the polymer (B) in the composite particles and even in the case of using the inorganic compound (B'), the (meth)acrylate compounds are preferable.

Examples of the (meth)acrylate compounds include (meth)acrylate monomers and (meth)acrylate oligomers.

Examples of the (meth)acrylate monomers include (meth)acrylate monomers having a carboxyl group and a functional group corresponding to the carboxyl group (such as a carboxylic anhydride group), (meth)acrylate monomers having a phosphoric acid group or a thiophosphoric acid group, (meth)acrylate monomers having a pyrophosphoric acid group, (meth)acrylate monomers having a sulfonic acid group, and (meth)acrylate monomers having a phosphonic acid group.

Examples of the (meth)acrylate monomers having a carboxyl group and a functional group corresponding to the carboxyl group (such as a carboxylic anhydride group) include monocarboxylic acids, dicarboxylic acids, tricarboxylic acids, tetracarboxylic acids, polycarboxylic acids, and anhydrides thereof, which have one or more (meth)acryloyloxy groups.

Specific examples include (meth)acrylic acids; aliphatic carboxylic acids having one or more (meth)acryloyloxy groups and one or more carboxyl groups, and anhydrides thereof, such as 11-(meth)acryloyloxy-1,1-undecanedicarboxylic acid (MAC-10 in the case of methacrylate); monocyclic aromatic carboxylic acids which have a linear hydrocarbon group containing one or more (meth)acryloyloxy groups and which have one or more carboxyl groups, and anhydrides thereof, such as 4-(meth)acryloyloxymethyltrimellitic acid, 4-(meth)acryloyloxyethyltrimellitic acid (4-MET in the case of methacrylate, 4-META in the case of the anhydride of methacrylate), 4-(meth)acryloyloxybutyltrimellitic acid, 1,4-di(meth)acryloyloxyethylpyromellitic acid, and 4-[2-hydroxy-3-(meth)acryloyloxy]butyltrimellitic acid; polycyclic aromatic carboxylic acids which have a linear hydrocarbon group containing one or more (meth)acryloyloxy groups and which have one or more carboxyl groups, and anhydrides thereof, such as 6-(meth)acryloyloxyethylnaphthalene-1,2,6-tricarboxylic acid; monocyclic aromatic carboxylic acids which have a linear hydrocarbon group containing one or more (meth)acryloyloxy groups and one or more hydrophilic functional groups such as hydroxyl groups and which have one or more carboxyl groups, and anhydrides thereof, such as 4-[2-hydroxy-3-(meth)acryloyloxy]butyltrimellitic acid; (meth)acrylates of alcohols which have one or more benzoyloxy groups containing one or more carboxyl groups, such as 2,3-bis(3,4-dicarboxybenzoyloxy)propyl (meth)acrylate; benzoic acids having one or more (meth)acryloyloxy groups, such as 2, 3 or 4-(meth)acryloyloxybenzoic acid; amino acids having an N-(meth)acryloyl group and/or an O-(meth)acryloyloxy group, such as O-(meth)acryloyloxy-N-(meth)acryloyltyrosine, O-(meth)acryloyloxytyrosine, N-(meth)acryloyltyrosine, and N-(meth)acryloyloxyphenylalanine; N- and/or O-mono or di(meth)acryloylaminobenzoic acids such as N-(meth)acryloyl-p-aminobenzoic acid, N-(meth)acryloyl-O-aminobenzoic acid, N-(meth)acryloyl-5-aminosalicylic acid (5-MASA in the case of methacrylate) and N-(meth)acryloyl-4-aminosalicylic acid, adducts of N-phenylglycine or N-tolylglycine with glycidyl (meth)acrylate, and aminophthalic acids in which a linear hydrocarbon group containing a hydrophilic group such as a hydroxyl group and a (meth) acryloyloxy group is bonded to an amino group and/or a carboxyl group, such as 4-[(2-hydroxy-3-(meth)acryloyloxypropyl)amino]phthalic acid and 3 or 4-[N-methyl-N-(2-hydroxy-3-(meth)acryloyloxypropyl)amino]phthalic acid. Of these, at least one selected from 11-methacryloyloxy-1,1-undecanedicarboxylic acid (MAC-10), 4-methacryloyloxyethyltrimellitic acid (4-MET), 4-MET anhydride (4-META) and N-methacryloyl-5-aminosalicylic acid (5-MASA) is preferable.

Examples of the (meth)acrylate monomers having a phosphoric acid group or a thiophosphoric acid group include alkyl acid phosphates having one or more (meth)acryloyloxy groups, such as 2-(meth)acryloyloxyethyl acid phosphate, 2- and/or 3-(meth)acryloyloxypropyl acid phosphate, 4-(meth)acryloyloxybutyl acid phosphate, 6-(meth)acryloyloxyhexyl acid phosphate, 8-(meth)acryloyloxyoctyl acid phosphate, 10-(meth)acryloyloxydecyl acid phosphate and 12-(meth)acryloyloxydodecyl acid phosphate; and aromatic acid phosphates which have an alkyl group containing one or more (meth)acryloyloxy groups and which have 0 or more other substituents, such as 2-(meth)acryloyloxyethylphenyl acid phosphate and 2-(meth)acryloyloxyethyl-p-methoxyphenyl acid phosphate. The phosphoric acid groups in these compounds may be replaced by thiophosphoric acid groups. Of these, at least one selected from 2-methacryloyloxyethylphenyl acid phosphate (Phenyl P) and 10-methacryloyloxydecyl acid phosphate (MDP) is preferable.

Examples of the (meth)acrylate monomers having a pyrophosphoric acid group include di{(meth)acryloyloxyalkyl} pyrophosphate compounds such as di{2-(meth)acryloyloxyethyl} pyrophosphate, di{4-(meth)acryloyloxybutyl} pyrophosphate, di{6-(meth)acryloyloxyhexyl} pyrophosphate, di{8-(meth)acryloyloxyoctyl} pyrophosphate and di{10-(meth)acryloyloxydecyl} pyrophosphate.

Examples of the (meth)acrylate monomers having a sulfonic acid group include alkyl (meth)acrylates having one or more sulfonic acid groups and 0 or more other substituents (e.g., alkyls, halogens, alkoxies), such as 2-sulfoethyl (meth)acrylate, 2- or 1-sulfo-1- or 2-propyl (meth)acrylate, 1- or 3-sulfo-2-butyl (meth)acrylate, 3-bromo-2-sulfo-2-propyl (meth)acrylate and 3-methoxy-1-sulfo-2-propyl (meth)acrylate.

Examples of the (meth)acrylate monomers having a phosphonic acid group include 3-(meth)acryloxypropyl-3-phosphonopropionate, 3-(meth)acryloxypropyl phosphonoacetate, 4-(meth)acryloxybutyl-3-phosphonopropionate, 4-(meth)acryloxybutyl phosphonoacetate, 5-(meth)acryloxypentyl-3-phosphonopropionate, 5-(meth)acryloxypentyl phosphonoacetate, 6-(meth)acryloxyhexyl-3-phosphonopropionate, 6-(meth)acryloxyhexyl phosphonoacetate, 10-(meth)acryloxydecyl-3-phosphonopropionate, 10-(meth)acryloxydecyl phosphonoacetate, 2-(meth)acryloxyethylphenyl phosphonate, 2-(meth)acryloyloxyethylphosphonic acid, 10-(meth)acryloyloxydecylphosphonic acid and N-(meth)acryloyl-ω-aminopropylphosphonic acid.

Examples of the (meth)acrylate oligomers include 2- to 1000-mer, preferably 10 to 500-mer of the (meth)acrylate monomer.

As the polymerizable compound having at least one acidic group in the molecule, the above (meth)acrylate monomers are preferable.

Examples of the polymerizable compounds other than the (meth)acrylate compounds include monomers having a carboxyl group directly bonded to a vinyl group, such as fumaric acid and maleic acid; monomers having a group such as an aromatic ring inserted between a vinyl group and a carboxyl group, such as p-vinylbenzoic acid; and alkyl (meth)acrylamides having one or more sulfonic acid groups and 0 or more other substituents (e.g., alkyls, halogens, alkoxies), such as 1,1-dimethyl-2-sulfoethyl (meth)acrylamide.

The roles of the polymerizable compound are to liberate the organoborane (A1) from the organoborane-Lewis base complex (A) and to thereby initiate radical polymerization, and also to facilitate the permeation of the polymerizable compound into hard tissues and to enhance its polymerizability. At least one selected from 4-MET, 4-META, Phenyl P and MDP is still more preferable, and at least one selected from 4-MET, 4-META and MDP is particularly preferable.

The polymerizable compounds may be used singly, or two or more thereof may be used in combination.

The amount of the polymerizable compound as the decomplexer (i) is usually 0.01 to 500 parts by mass, preferably 0.1 to 200 parts by mass, and more preferably 1 to 100 parts by mass, per 100 parts by mass of the total of the organoborane-Lewis base complex (A) in the composition (1) and the polymerizable compound (ii) having no acidic group in the molecule in the composition (2). Such an embodiment is advantageous in that the organoborane can favorably initiate the polymerization of the polymerizable compound.

<Polymerizable Compound (ii) Having No Acidic Group in the Molecule>

The polymerizable compound (ii) having no acidic group in the molecule is a compound having at least one ethylenically unsaturated group capable of radical polymerization and having no acidic group in the molecule. Examples of the acidic groups include carboxylic acid groups such as a carboxyl group and a carboxylic anhydride group, phosphoric acid groups, thiophosphoric acid groups, pyrophosphoric acid groups, sulfonic acid groups, and phosphonic acid groups.

Examples of the polymerizable compounds (ii) include (meth)acrylate compounds having no acidic group in the molecule, and polymerizable compounds having no acidic group in the molecule other than those (meth)acrylate compounds, and from the viewpoint of the solubility of the polymer (B) in the composite particles and even in the case of using the inorganic compound (B'), the (meth)acrylate compounds are preferable.

Examples of the (meth)acrylate compounds include (meth)acrylate monomers and (meth)acrylate oligomers.

Examples of the (meth)acrylate monomers include (meth)acrylate esters of monohydric alcohols (in particular, alkanols having 1 to 12 carbon atoms) such as methyl (meth)acrylate, ethyl (meth)acrylate, propyl (meth)acrylate, butyl (meth)acrylate, ethylhexyl (meth)acrylate and tetrahydrofurfuryl (meth)acrylate; mono(meth)acrylate esters and di(meth)acrylate esters of polyhydric alcohols such as ethylene glycol, diethylene glycol, triethylene glycol, tetraethylene glycol, polyethylene glycol, propylene glycol, dipropylene glycol, tripropylene glycol, tetrapropylene glycol, pentapropylene glycol, glycerol and trimethylolpropane; and di(meth)acrylate esters of ethoxylated diphenolpropane and propoxylated diphenolpropane.

Examples of the (meth)acrylate oligomers include 2- to 1000-mer, and preferably 10 to 500-mer of the (meth)acrylate monomer.

As the polymerizable compound having no acidic group in the molecule, the above (meth)acrylate monomers are preferable.

Examples of the polymerizable compounds other than the (meth)acrylate compounds include alkyl (meth)acrylamide compounds such as N,N-dimethyl (meth)acrylamide, N,N-diethyl (meth)acrylamide, N-butyl (meth)acrylamide, N-((meth)acryloyl)morpholine, N-((meth)acryloyl)piperidine and 2-hydroxyethyl (meth)acrylamide.

The polymerizable compounds (ii) may be used singly, or two or more thereof may be used in combination.

<Filler (iii)>

The polymerizable composition (2) may include a filler (iii) as required. By using the filler (iii), the viscosity of the polymerizable composition (2) can be adjusted, or the polymerization rate or the curing time can be adjusted to a desired level.

Examples of the fillers (iii) include inorganic fillers, organic fillers, and organic composite fillers combining an organic component and an inorganic component.

Examples of the inorganic fillers include amorphous silica, alumina, quartz, alumina quartz, silica-alumina compounds, silica-zirconia compounds, silica-titania compounds, titanium oxide, glass (including barium glass), zirconium oxide, calcium carbonate, kaolin, clay, mica, aluminum sulfate, barium sulfate, calcium sulfate, calcium phosphate and hydroxyapatite. The inorganic fillers may be surface-treated with a silane coupling agent, a titanate coupling agent or the like in advance.

The organic fillers may be polymers which are not substantially dissolved into the polymerizable compounds, and examples thereof include fillers including such polymers as polyethylene, polypropylene, ethylene propylene copolymer, ethylene propylene terpolymer, polyisoprene, ethylene vinyl acetate copolymer, silicone polymer and acrylate ester copolymer.

Examples of the organic composite fillers include fillers obtained by polymerizing a polymerizable compound so as to coat the surface of the aforementioned inorganic filler followed by crushing. Specific examples thereof include fillers (TMPT·f) obtained by polymerizing polymerizable compounds containing trimethylolpropane tri(meth)acrylate (TMPT) as a main component so as to coat fine powdery silica, and crushing the resulting polymer.

The (volumetric) average particle size of the filler (iii) is preferably 0.01 to 100 μm, and it is more preferable to use a mixture of fillers having different particle sizes. The average particle size is measured by a grain size distribution analyzer (laser diffraction/scattering method).

When the filler (iii) is used, the content of the filler (iii) in the polymerizable composition (2) varies depending on its application, and is, for example, 0.1 to 20 mass % in 100 mass % of the polymerizable composition (2).

<Additional Components (iv)>

The polymerizable composition (2) may contain additional components (iv) in addition to the above-mentioned components. Examples of the additional components (iv) include a polymerization inhibitor.

Examples of the polymerization inhibitors include quinone compounds, phenol compounds having two or more substituents on the aromatic ring, catechol compounds, oxydiphenylamine compounds, nitroso compounds, nitrone compounds, nitrile compounds, hydrazyl compounds and phenothiazine compounds.

As the quinone compound, hydroquinone monomethyl ether, p-benzoquinone, 2,6-dichloro-p-benzoquinone, 2,5-dichloro-p-benzoquinone, 2-t-butylhydroquinone and butylhydroxyanisole are preferable.

As the phenol compound having two or more substituents on the aromatic ring, 3,5-t-dibutyl-6-hydroxytoluene is preferable.

As the catechol compound, catechol and 4-t-butylcatechol are preferable.

As the oxydiphenylamine compound, 2-oxydiphenylamine, isomers thereof which have the hydroxyl group at different positions (3-oxy isomer, 4-oxy isomer), and the aforementioned amines having one or more substituents, for example, a hydrocarbon group such as a methyl group, and a halogen atom such as a chlorine atom are preferable.

As the nitroso compound, compounds which have a nitroso group bonded to an α-carbon of the carbonyl such as methyl-α-nitrosoisopropyl ketone, and N-nitroso-N-phenylhydroxylamines such as N-nitroso-N-phenylhydroxylamine ammonium salt and N-nitroso-N-phenylhydroxylamine aluminum salt are preferable.

As the nitrone compound, phenyl-t-butylnitrone is preferable.

As the nitrile compound, compounds in which a nitrile group forms a conjugated system, such as furfurylidenemalononitrile, are preferable.

As the hydrazyl compound, 1,1-diphenyl-2-picrylhydrazyl is preferable.

As the phenothiazine compound, phenothiazine and those having one or more substituents, for example, a hydrocarbon group such as a methyl group and a halogen atom such as a chlorine atom in the aromatic ring portion of phenothiazine are preferable.

The polymerization inhibitors may be used singly, or two or more thereof may be used in combination.

The content of the polymerization inhibitor is, for example, usually 0.001 to 1 parts by mass, preferably 0.005 to 0.5 parts by mass, per 100 parts by mass of the polymerizable compound from the viewpoint of preventing or reducing the decomposition of the polymerizable compound during storage and not substantially reducing the polymerization rate of the polymerizable compound.

Examples of the additional components (iv) include, in addition to the polymerization inhibitors, peroxides (typically used in an amount of 2 mass % or less based on the mass of the whole composition), and photopolymerization initiators (typically used in an amount of 5 mass % or less based on the mass of the whole composition).

A solvent may be added to the polymerizable composition (2) as required. Examples of the solvents include water; and organic solvents such as alcohols including ethanol and propanol, and ketones including acetone. As the water, distilled water, ion-exchanged water, purified water (the Japanese Pharmacopoeia) and the like may be used, and physiological saline and the like may be used instead of water, and purified water (the Japanese Pharmacopoeia) is particularly preferable. The solvents may be used singly, or two or more thereof may be used in combination.

<Polymerizable Compound Contained in Polymerizable Composition (2)>

The polymerizable composition (2) contains a polymerizable compound. Examples of the polymerizable compounds include the polymerizable compounds having at least one acidic group in the molecule contained in the decomplexer (i) and the polymerizable compounds (ii) having no acidic group in the molecule.

From the viewpoint that the polymerizable composition (2) preferably contains the decomplexer (i) and the polymerizable compound (ii) having no acidic group in the molecule and the decomplexer (i) is preferably a polymerizable compound having at least one acidic group in the molecule, the polymerizable composition (2) preferably contains the polymerizable compound having at least one acidic group in the molecule and the polymerizable compound (ii) having no acidic group in the molecule.

As described above, the polymerizable compound preferably dissolves the polymer (B) of the composite particles. From the viewpoint of the solubility of the polymer (B) and even in the case of using the inorganic compound (B'), the polymerizable compound having at least one acidic group in the molecule is preferably a (meth)acrylate compound, and more preferably a (meth)acrylate monomer. Similarly, the polymerizable compound (ii) having no acidic group in the molecule is preferably a (meth)acrylate compound, and more preferably a (meth)acrylate monomer.

The content of the polymerizable compound in 100 mass % of the composition (2) is preferably 80 to 100 mass %, and more preferably 90 to 100 mass %.

In 100 mass % of the polymerizable compound, the content of the polymerizable compound having at least one acidic group in the molecule is preferably 0.1 to 50 mass %, and more preferably 1 to 30 mass %.

In 100 mass % of the polymerizable compound, the content of the polymerizable compound (ii) having no acidic group in the molecule is preferably 50 to 99.9 mass %, and more preferably 70 to 99 mass %.

<Preparation of Kit and the Like>

The kit of the present invention includes the composition (1) and the composition (2) described above, and the composition (1) and the composition (2) are mixed at the time of use. The organoborane-Lewis base complex (A) is thus gradually released as the polymer (B) in the composite particles contained in the composition (1) dissolves in the polymerizable compound contained in the composition (2). Alternatively, the complex (A) is gradually diffused into the system from the surface layer portion of the inorganic compound (B') in the composite particles contained in the composition (1). The organoborane (A1) is liberated by, for example, the decomplexer (i) acting on the organoborane-Lewis base complex (A). The organoborane (A1) functions as a polymerization initiator and thereby allows the polymerization reaction of the polymerizable compound to proceed.

In the kit of the present invention, the composition (1) and the composition (2) are mixed in an amount such that the composition (2) is preferably 1 to 500 parts by mass, and more preferably 10 to 300 parts by mass, per 100 parts by mass of the composition (1).

[Material Obtained from Kit and its Applications]

By mixing the composition (1) and the composition (2) of the kit, a material of the present invention can be obtained. The material may be suitably used as an adhesive and a filler, and also may be suitably used for medical and/or dental applications, and may be particularly suitably used as an adhesive and a filler for those applications.

For example, the material of the present invention is suited as an adhesive or a filler in the applications described above, and is particularly suited as an adhesive for the bonding of biological hard tissues to one another, an adhesive for the bonding between an adherend and a hard tissue, and a filler inside an adherend or a hard tissue. Examples of the biological hard tissues include tooth structures and bones. Examples of the adherends include dental metals, dental alloys, dental porcelains and dental resins.

Although performing a pretreatment on hard tissues does not provide any particular effects in the initial adhesion exhibited by the material of the present invention, it is preferable from the viewpoint of adhesion durability that the material be used in combination with pretreatment. Examples of the pretreatments include etching with a tooth surface-treating agent containing an acid, and surface modification with a tooth surface-treating agent containing an oxidizer.

For the details of the pretreatment, when the material of the present invention is used in direct contact with tooth structure, the surface of the tooth structure is pretreated in accordance with the situation and the material of the present invention is thereafter applied. In this manner, adhesion durability is advantageously enhanced.

In the pretreatment, a pretreatment agent containing an acid such as a Lewis acid may be used, and examples thereof include aqueous solutions with 5 or less pH which contain, for example, an acid not having ethylenically unsaturated double bonds such as hydrochloric acid, nitric acid, sulfuric acid, phosphoric acid, citric acid or oxalic acid, or an acidic group-containing polymerizable component such as maleic acid, 4-META or MDP and which optionally further contain an organic solvent; and aqueous solutions which contain a chelating compound such as ethylenediamine tetraacetate (EDTA), and other examples of the pretreatment agents include hydrogen peroxide solution and aqueous sodium hypochlorite solution. From the viewpoint of polymerization initiation, the material of the present invention is preferably used in combination with an aqueous solution having a pH of 5 or less or in combination with hydrogen peroxide or aqueous sodium hypochlorite solution.

EXAMPLES

The present invention will be described in further detail based on Examples. However, it should be construed that the scope of the present invention is not limited to such Examples.

Synthesis of Organoborane-Lewis Base Complexes

Synthesis Example 1

A flask was purged with nitrogen and was loaded with 0.1 mol of 1,3-diaminopropane. A solution of 0.1 mol of triethylborane in 100 mL of tetrahydrofuran was added to the flask. After the whole of the triethylborane solution had been added, stirring was performed for about 1 hour while performing cooling to keep the solution in the flask at about 40° C. Thereafter, the tetrahydrofuran was removed with a rotary evaporator to obtain triethylborane-1,3-diaminopropane complex.

Synthesis Example 2

Tri-n-butylborane-3-methoxy-1-propylamine complex was obtained in the same manner as in Synthesis Example 1, except that 3-methoxy-1-propylamine was used instead of 1,3-diaminopropane and tri-n-butylborane was used instead of triethylborane.

Synthesis Example 3

Triethylborane-diethylenetriamine complex was obtained in the same manner as in Synthesis Example 1, except that diethylenetriamine was used instead of 1,3-diaminopropane.

The measuring method of the physical properties is as follows.

[GPC]

The weight average molecular weight (Mw) of the polymer (B) was determined by gel permeation chromatography (GPC) under the following conditions.

Measuring device: LC-10AD (manufactured by Shimadzu Corporation)

GPC column: LF-804 (manufactured by Showa Denko K.K.) Column size 300×8.0 mm I.D.

Flow rate: 0.5 mL/min.

Column temperature: 40° C.

Sample concentration: 0.05% (w/v) (diluted with tetrahydrofuran)

Mobile phase solvent: tetrahydrofuran

Standard polymethyl methacrylate conversion

[Average Particle Size]

The average particle size of each of the inorganic compound (B') and the composite particles is a 50% particle size (d50, median diameter) when the particle size distribution measured by a grain size distribution analyzer (laser diffraction/scattering method) is represented by a volume cumulative distribution.

[Liquid Adsorption]

The liquid adsorption of the inorganic compound (B') was measured according to JIS K 5101.

I. Production of Composite Particles

Example 1

5 g of polymethyl methacrylate (Mw: 400,000 measured by GPC) was dissolved in 30 g of acetone. Further, 3 g of tri-n-butylborane-3-methoxy-1-propylamine complex was added thereto, followed by stirring until the mixture became homogeneous. Thereafter, the mixture was poured into a vat of 30 cm×25 cm×5 cm and dried at room temperature overnight to obtain a film polymer having a thickness of 0.5 cm. The film polymer was crushed at 50 Hz for 5 minutes in a freezer mill (TKS-4, manufactured by Ito Seisakusho Co., Ltd.). The obtained powder was used as composite particles 1. The average particle size of the composite particles 1 was 30 μm.

Example 2

5 g of polymethyl methacrylate (Mw: 10,000 measured by GPC) was dissolved in 30 g of acetone. Further, 3 g of a triethylborane-diethylenetriamine complex was added thereto, followed by stirring until the mixture became homogeneous. Thereafter, in the same manner as in Example 1, the mixture was dried, and the obtained film polymer was crushed to obtain composite particles 2. The average particle size of the composite particles 2 was 25 μm.

Example 3

5 g of methyl methacrylate-ethyl methacrylate copolymer (Mw: 50,000 measured by GPC) was dissolved in 30 g of acetone. Further, 3 g of tri-n-butylborane-3-methoxy-1-propylamine complex was added thereto, followed by stirring until the mixture became homogeneous. Thereafter, in the same manner as in Example 1, the mixture was dried, and the obtained film polymer was crushed to obtain composite particles 3. The average particle size of the composite particles 3 was 28 μm.

Example 4

200 mL of hexane was placed in a 1 L eggplant flask, and 10 g of triethylborane-1,3-diaminopropane complex was added thereto, followed by stirring until the mixture became homogeneous. Next, 10 g of $Mg_{0.7}Al_{0.3}O_{1.15}$ having a liquid adsorption of 290 mL/100 g and an average particle size of 12 μm was added and stirred. Thereafter, the solvent was distilled off with a rotary evaporator under reduced pressure for 5 hours in a state of being heated to 40° C. to give composite particles 4.

Example 5

200 mL of hexane was placed in a 1 L eggplant flask, and 10 g of tri-n-butylborane-3-methoxy-1-propylamine complex was added thereto, followed by stirring until the mixture became homogeneous. Next, 10 g of $Mg_{0.7}Al_{0.3}O_{1.15}$ having a liquid adsorption of 290 mL/100 g and an average particle size of 12 μm was added and stirred. Thereafter, the solvent was distilled off with a rotary evaporator under reduced pressure for 5 hours in a state of being heated to 40° C. to give composite particles 5.

II. Preparation of Dental Materials

Preparation Example 1

50 g of the composite particles 1 and 50 g of polymethyl methacrylate (Mw: 400,000 measured by GPC) were mixed to prepare a polymerization initiator composition (1)-1.

80 g of methyl methacrylate and 20 g of 4-methacryloyloxyethyl trimellitic acid were mixed to prepare a polymerizable composition (2)-1.

0.2 g each of the above (1)-1 and (2)-1 were collected and mixed immediately before use to prepare a dental material.

Preparation Example 2

50 g of the composite particles 2 and 50 g of polymethyl methacrylate (Mw: 400,000 measured by GPC) were mixed to prepare a polymerization initiator composition (1)-2.

90 g of methyl methacrylate and 10 g of 10-methacryloyloxydecyl acid phosphate were mixed to prepare a polymerizable composition (2)-2.

0.2 g each of the above (1)-2 and (2)-2 were collected and mixed immediately before use to prepare a dental material.

Preparation Example 3

50 g of the composite particles 3 obtained in Example 3 and 50 g of polymethyl methacrylate (Mw: 400,000 measured by GPC) were mixed to prepare a polymerization initiator composition (1)-3.

0.2 g each of the above (1)-3 and (2)-1 prepared in Preparation Example 1 were collected and mixed immediately before use to prepare a dental material.

Preparation Example 4

20 g of the composite particles 4 obtained in Example 4 and 80 g of polymethyl methacrylate (Mw: 400,000 measured by GPC) were mixed to prepare a polymerization initiator composition (1)-4.

95 g of methyl methacrylate and 5 g of 4-methacryloyloxyethyl trimellitic anhydride were mixed to prepare a polymerizable composition (2)-3.

0.09 g of the above (1)-4 and 0.15 g of the above (2)-3 were collected and mixed immediately before use to prepare a dental material.

Preparation Example 5

20 g of the composite particles 5 obtained in Example 5 and 80 g of polymethyl methacrylate (Mw: 400,000 measured by GPC) were mixed to prepare a polymerization initiator composition (1)-5. 0.09 g of the above (1)-5 and 0.15 g of the above (2)-3 were collected and mixed immediately before use to prepare a dental material.

Comparative Preparation Example 1

Tri-n-butylborane-3-methoxy-1-propylamine complex was used as a polymerization initiator (1)-6.

0.094 g of the above (1)-6, 0.106 g of polymethyl methacrylate (Mw: 400,000 measured by GPC), and 0.2 g of the (2)-1 prepared in Preparation Example 1 were mixed immediately before use to prepare a dental material.

Comparative Preparation Example 2

Triethylborane-diethylenetriamine complex was used as a polymerization initiator (1)-7.

0.094 g of the above (1)-7, 0.106 g of polymethyl methacrylate (Mw: 400,000 measured by GPC), and 0.2 g of the (2)-1 prepared in Preparation Example 1 were mixed immediately before use to prepare a dental material.

<<Evaluations>>

[Long-Term Stability Evaluation]

The polymerization initiator compositions and the polymerization initiators (1)-1 to (1)-7 prepared in Preparation Examples and Comparative Preparation Examples each was put into a sample bottle and stored at room temperature for 3 months or 12 months without a lid. Dental materials were prepared using the above (1)-1 to (1)-7 immediately after the preparation, stored at room temperature for 3 months, and stored at room temperature for 12 months, and the adhesive strength of each was measured by the following method.

A bovine tooth was cut with #180 water-resistant abrasive paper to expose dentin. A double-sided tape having a hole of 04.8 mm was adhered to the exposed dentin surface to specify an adhesion area (hereinafter, also referred to as a "specified surface"). The surface treatment material "Green" (manufactured by Sun Medical Co., Ltd.) was applied to the specified surface, washed with water 30 seconds later, and subjected to air blow. Thereafter, a dental material was applied to the specified surface, an acrylic rod was planted, and the dental material was allowed to stand at room temperature for 30 minutes to cure. The bovine tooth on which the acrylic rod was planted was immersed in water at 37° C. overnight, and a tensile test was performed with a tensile tester at a crosshead speed of 2 mm/min to measure the adhesive strength to bovine dentin.

TABLE 1

| | Adhesive strength (MPa) | | |
| --- | --- | --- | --- |
| | Immediately after preparation | Stored at room temperature for 3 months | Stored at room temperature for 12 months |
| Preparation Example 1 | 10.4 ± 3.5 | 9.7 ± 2.4 | 11.1 ± 4.0 |
| Preparation Example 2 | 12.4 ± 1.7 | 10.3 ± 2.9 | 9.6 ± 1.6 |
| Preparation Example 3 | 9.6 ± 2.9 | 8.7 ± 3.0 | 10.8 ± 1.4 |
| Preparation Example 4 | 11.3 ± 2.3 | 10.9 ± 1.1 | 12.8 ± 2.4 |
| Preparation Example 5 | 10.2 ± 1.8 | 8.9 ± 2.9 | 8.1 ± 3.4 |
| Comparative Preparation Example 3 | 13.0 ± 1.8 | 6.9 ± 1.0 | — |
| Comparative Preparation Example 2 | 12.1 ± 0.9 | 7.3 ± 2.2 | — |

* In the table "—" indicates that measurement was impossible, and "±" indicates the range of error.

As a result of the long-term stability evaluation, the dental materials of Preparation Examples 1 to 5 using the composite particles produced in Examples 1 to 5 show almost no decrease in the adhesive strength even after storage at room temperature for 12 months. On the other hand, in the dental materials of Comparative Preparation Examples 1 and 2, the polymerization initiator was deactivated after storage at room temperature for 3 months resulting in a decrease in the adhesive strength. In the case of storage at room temperature for 12 months, the polymerization initiators were decomposed and volatilized, and the polymerization initiators thereby disappeared and the dental materials could not be prepared, so that the adhesive strengths could not be measured.

The invention claimed is:

1. Composite particles comprising:
   component (B): particles of an organic polymer; and
   component (A): an organoborane-Lewis base complex contained in the component (B).

2. The composite particles according to claim 1, wherein an organoborane of the component (A) is at least one selected from:
   a compound represented by $BR_3$, wherein each R is independently an alkyl group having 1 to 20 carbon atoms, an aryl group having 6 to 20 carbon atoms, a saturated or unsaturated alicyclic group having 3 to 20 carbon atoms, or an alkoxy group having 1 to 20 carbon atoms, and two or more of the groups R may be bonded to each other to form a ring; and
   a partial oxide of the compound represented by $BR_3$.

3. The composite particles according to claim 1, wherein a Lewis base of the component (A) is at least one selected from an amine, an amidine, a hydroxide, and an alkoxide.

4. The composite particles according to claim 1, wherein the component (A) is a compound represented by $(N(R^1)_m(H)_{2-m}-R^2O)_n BR_{3-n}$, wherein $R^1$ is an alkyl group having 1 to 20 carbon atoms, $R^2$ is an alkylene group having 1 to 20 carbon atoms, R is an alkyl group having 1 to 20 carbon atoms, an aryl group having 6 to 20 carbon atoms, a saturated or unsaturated alicyclic group having 3 to 20 carbon atoms, or an alkoxy group having 1 to 20 carbon atoms, two of the groups R may be bonded to each other to form a ring, m is 1 or 2, and n is 1 or 2.

5. The composite particles according to claim 1, wherein the component (B) has a weight average molecular weight (Mw) of 1,000 to 3,000,000, as measured by gel permeation chromatography (GPC) with a polymethyl methacrylate standard.

6. The composite particles according to claim 1, wherein a content of the component (B) is 50 to 5,000 parts by mass per 100 parts by mass of the organoborane-Lewis base complex (A).

7. A kit comprising:
the composite particles according to claim 1 or a composition containing the composite particles; and
a polymerizable composition containing a polymerizable compound.

8. The kit according to claim 7,
wherein the polymerizable composition contains:
- a polymerizable compound having at least one acidic group in the molecule; and
- a polymerizable compound having no acidic group in the molecule.

9. The kit according to claim 7,
wherein at 25° C., the component (B) contained in the composite particles dissolves at a ratio of 1 part by mass or more to 100 parts by mass of the polymerizable compound contained in the polymerizable composition.

10. A material obtained from the kit according to claim 7.

11. The material according to claim 10, which is used for medical and/or dental applications.

12. The material according to claim 10, which is used as an adhesive or a filler.

13. A method for producing composite particles, comprising the steps of:
dissolving an organic polymer (B) in a solvent to prepare a solution of the organic polymer (B) and mixing the solution with an organoborane-Lewis base complex (A) to prepare a composition containing the organoborane-Lewis base complex (A) and the organic polymer (B) dissolved in the solvent; and
drying the composition.

* * * * *